(12) United States Patent
Hino et al.

(10) Patent No.: US 10,036,679 B2
(45) Date of Patent: Jul. 31, 2018

(54) FLUID DETECTION DEVICE

(71) Applicant: KOKOKU INTECH CO., LTD., Tokyo (JP)

(72) Inventors: Hirofumi Hino, Saitama (JP); Tadashi Mihara, Saitama (JP); Yutaka Kikuchi, Saitama (JP)

(73) Assignee: KOKOKU INTECH CO., LTD. (JP)

( * ) Notice: Subject to any disclaimer, the term of this patent is extended or adjusted under 35 U.S.C. 154(b) by 0 days.

(21) Appl. No.: 15/486,772

(22) Filed: Apr. 13, 2017

(65) Prior Publication Data

US 2017/0276560 A1 Sep. 28, 2017

Related U.S. Application Data

(63) Continuation of application No. PCT/JP2015/077946, filed on Oct. 1, 2015.

(30) Foreign Application Priority Data

Oct. 16, 2014 (JP) .................................. 2014-211835

(51) Int. Cl.
G01L 7/08 (2006.01)
G01L 7/02 (2006.01)
G01L 9/00 (2006.01)

(52) U.S. Cl.
CPC .............. G01L 7/022 (2013.01); G01L 7/086 (2013.01); G01L 9/007 (2013.01)

(58) Field of Classification Search
CPC ......... G01L 7/022; G01L 7/086; G01L 9/007; H01H 35/24; H01H 35/26; H01H 35/2621

(Continued)

(56) References Cited

U.S. PATENT DOCUMENTS 6,649,046 B2 * 11/2003 Chevallet ............ A61M 1/3639
  210/90
8,156,817 B2 * 4/2012 Kaneko et al. ......... G01L 9/007
  361/283.4

(Continued)

FOREIGN PATENT DOCUMENTS

JP  S4810856 Y1  3/1973
JP  H08203400 A  8/1996
JP  200150824 A  2/2001

OTHER PUBLICATIONS

PCT/JP2015/077946 International Search Report dated Dec. 22, 2015; 2 pgs.

*Primary Examiner* — Lisa Caputo
*Assistant Examiner* — Roger Hernandez-Prewit
(74) *Attorney, Agent, or Firm* — Bracewell LLP; Brad Y. Chin

(57) ABSTRACT

Embodiments provide a fluid detection device including a casing connectable to a tube filled with water and allows the water to flow to a hollow inner part; a partition wall deformable so that the hollow inner part is divided into a fluid chamber filled with the water and an air chamber opened to the atmosphere; a slide tip disposed inside the fluid chamber; and a tip sensor disposed outside the casing. According to at least one embodiment, a slide holding part which holds the slide tip slidably forward and backward is formed inside the fluid chamber, an opening part is formed in the air chamber, a magnet is disposed in the casing, the slide tip includes a magnet provided at a position facing the magnet and repelling the magnet.

6 Claims, 2 Drawing Sheets

(58) Field of Classification Search
USPC ......... 73/700, 715; 200/81.9 M, 82 C, 82 D, 200/82 E, 83 J, 83 L; 92/111, 130 B, 92/130 C, 96
See application file for complete search history.

(56) References Cited

U.S. PATENT DOCUMENTS

| | | | |
|---|---|---|---|
| 2009/0151463 A1* | 6/2009 | Recio et al. ........... | H03K 17/97 73/715 |
| 2013/0150225 A1* | 6/2013 | Katz et al. ............. | G01L 11/02 494/10 |

* cited by examiner

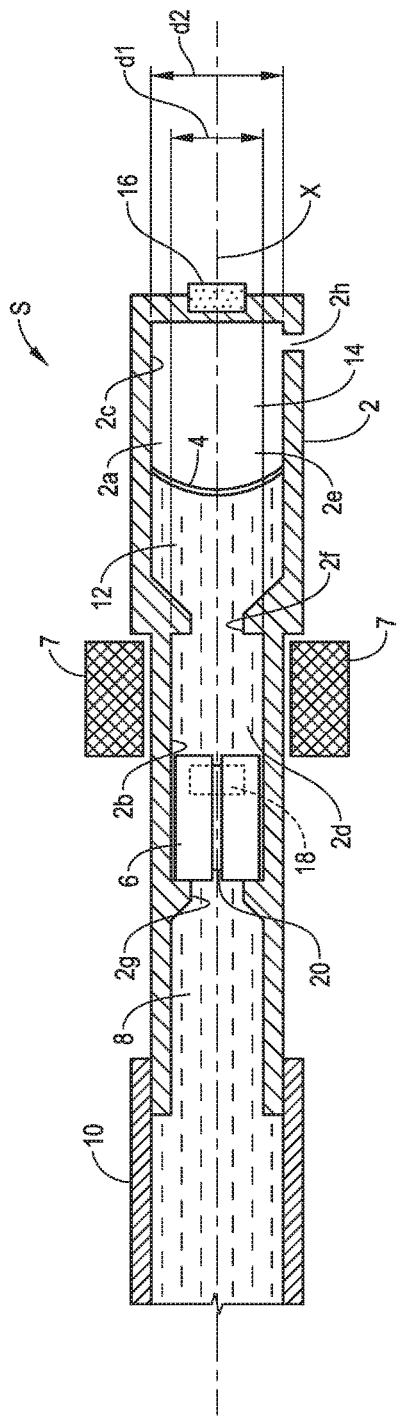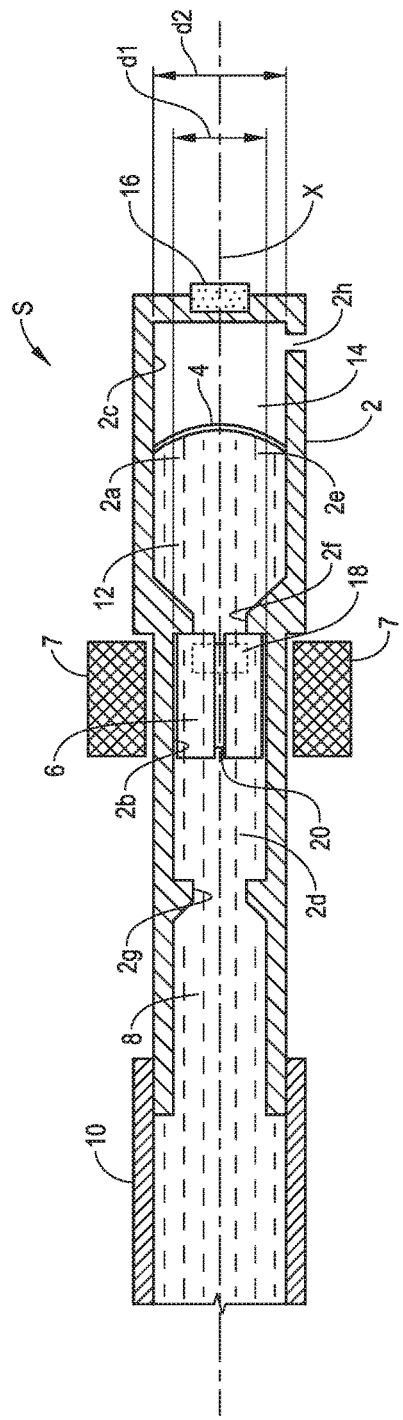

FLUID DETECTION DEVICE

CROSS-REFERENCE TO RELATED APPLICATION

This application is a continuation application of International Application No. PCT/JP2015/077946, filed Oct. 1, 2015. The contents of this application are incorporated herein by reference in their entirety.

BACKGROUND

Field

Embodiments relate to a fluid detection device, and particularly, to a fluid detection device that detects a movement of a fluid by detecting a movement of a slide tip disposed in a fluid.

Description of the Related Art

In recent years, a pressure detection device that detects a pressure of a fluid is used as a detection device using a fluid. For example, Patent Document JP 2001-050824 A discloses a contact sensor which includes a tube elastically deformed by the pressing from the outside and a pressure sensing part detecting a change in gas pressure in the tube and detects a contact of a foreign material on the tube based on the detection result of the pressure sensing part. The pressure sensing part includes a piezoelectric element, which is displaced in accordance with a change in fluid pressure and is formed of a piezoelectric material generating an electric charge corresponding to the displacement and an output circuit which has finite input impedance and generates a detection signal based on an electric charge generated in the piezoelectric element.

SUMMARY

However, the device disclosed in Patent Document JP 2001-050824 A is stabilized by a genius in the electric circuit, but since the device detects a change in pressure with a complicated structure, the detection result tends to be unstable due to a change in volume of the fluid in accordance with a temperature change or an attachment state. As a result, a stable operation of the detection device is hardly ensured.

Embodiments have been made to solve the above-described problems and an object of the various embodiments is to provide a fluid detection device that realizes a stable fluid detection regardless of a temperature change or an attachment state.

Embodiments have the following configuration in order to solve the above-described problems.

According to at least one embodiment, there is provided (1) a fluid detection device including: a casing which is connectable to one end of an elastic container filled with a fluid and has a hollow inner part so that the fluid inside the elastic container is able to flow to the hollow inner part; a partition wall which is disposed in the hollow inner part and is deformable so that the hollow inner part is divided into a fluid chamber filled with the fluid and an air chamber opened to the atmosphere; a slide tip which is disposed inside the fluid chamber; and a detecting means which is disposed outside the casing, wherein a slide holding part which holds the slide tip to be slidable forward and backward in one direction is formed inside the fluid chamber, wherein the air chamber is provided with an opening part which absorbs a change in pressure inside the air chamber due to a deformation of the partition wall, wherein a first magnet is disposed in the casing to be located at a position along the movement direction of the slide tip, wherein the slide tip includes a second magnet which is provided at a position facing the first magnet and repelling the first magnet, wherein the detecting means is able to detect the movement of the slide tip, and wherein the movement of the slide tip is detected based on an elastic deformation of the elastic container.

According to at least one embodiment, (2) stoppers which restrict the movement of the slide tip may be located at positions near both ends of the slide holding part in the movement direction of the slide tip.

According to at least one embodiment, (3) a repulsive force generated by the first magnet and the second magnet may be a repulsive force capable of bringing the slide tip into contact with the stopper located at the end of the slide holding part at the side farther from the partition wall.

According to at least one embodiment, (4) at least one of the slide tip and the slide holding part may be provided with a circulation part for circulating the fluid between the side of the elastic container and the side of the partition wall.

According to at least one embodiment, (5) the slide tip may have a substantially columnar shape, the casing may have a substantially cylindrical shape, and a diameter of the air chamber may be larger than a diameter of the slide holding part.

According to at least one embodiment, (6) a density of the entire slide tip including the second magnet may be in the range of 0.5 times to 2.8 times a density of the fluid.

According to the various embodiments, it is possible to provide a fluid detection device that realizes a stable fluid detection regardless of a temperature change or an attachment state.

BRIEF DESCRIPTION OF THE DRAWINGS

FIG. 1 shows (a) and (b) of a cross-sectional view showing a schematic structure of a fluid sensor according to an embodiment.

DETAILED DESCRIPTION

Figure 2:
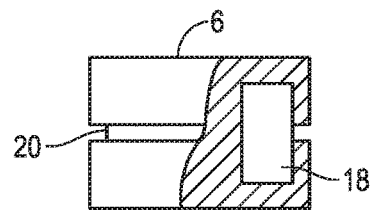
FIG. 2 is a partial cross-sectional view of a slide tip used in the fluid sensor according to an embodiment.

Embodiments of a fluid detection device according to the invention will be described below with reference to the drawings.

Embodiment 1

FIG. 1 shows (a) and (b) of a cross-sectional view showing a schematic structure of a fluid sensor (a fluid detection device) S of embodiment 1. FIG. 1 is a schematic cross-sectional view when viewed from a lateral side and the fluid sensor S has a substantially circular shape when viewed from a front side. That is, the fluid sensor S has a shape in which the cross-sectional view of FIG. 1 is rotated about the axis X as a whole.

According to at least one embodiment, the fluid sensor S schematically includes a casing 2, a partition wall 4, a slide tip 6, and a tip sensor (a detecting means) 7. The casing 2 is connected to one end of a tube (an elastic container) 10 filled with water (fluid) 8. Additionally, in the embodiment 1, the tube 10 will be described as an example of the elastic container. The tube 10 is, for example, a tubular member formed of an elastic material which is a resin such as silicone, polyethylene and nylon, or rubber. The tube is filled with the water 8 which is a fluid. As the fluid, oil such as silicone oil, other liquids, and gases such as air are considered other than water, but a liquid is desirable from the viewpoint of a small change in volume with respect to pressure. Here, the "filling" is not essentially limited to a case where only the fluid is completely filled into the tube without any mixture of other materials and includes a case where the majority is filled with the fluid. For example, a case where the tube is filled with the water 8 partially containing a gas such as bubbles is also referred to as the "filling".

According to at least one embodiment, the casing 2 is formed in a cylindrical shape as a whole and an inner part thereof is hollow (a hollow inner part 2a). The casing 2 is formed of, for example, a material such as resin, metal, and glass, has a step shape in an outer shape, and includes a small diameter part 2b and a large diameter part 2c having a diameter larger than that of the small diameter part 2b. The casing 2 is connected to one end of the tube 10 and the water 8 inside the tube 10 can be circulated to the hollow inner part 2a (to flow thereinto and therefrom).

According to at least one embodiment, a slide holding part 2d is formed at the hollow inner part 2a of a portion corresponding to the small diameter part 2b and a buffer part 2e which is a reservoir tank is formed at the hollow inner part 2a of a portion corresponding to the large diameter part 2c. A diameter d2 of the buffer part 2e is larger than a diameter d1 of the slide holding part 2d. Since the diameter d2 is larger than the diameter d1, it is possible to suppress a deformation (a movement) of the partition wall 4 to a small degree with respect to a change in volume of a fluid chamber 12 (to be described later).

According to at least one embodiment, the slide holding part 2d is a portion which holds the slide tip 6 so that the slide tip 6 is slidable forward and backward in one direction (a direction of the axis X). Here, in (a) of FIG. 1, the right direction (the direction in which the slide tip 6 faces the partition wall 4) is set as normal direction and the left direction (the direction in which the slide tip 6 faces the tube 10) is set as reverse direction. In addition, the normal direction is also referred to as front direction and the reverse direction is also referred to as rear direction. The "holding" includes a meaning that the slide tip 6 is held in a loose fitting state so that the slide tip is smoothly slidable in the normal/reverse direction. Thus, when the slide tip 6 has a substantially columnar shape, the slide holding part 2d is formed in a cylindrical shape having a diameter slightly larger than the diameter of the slide tip 6.

According to at least one embodiment, a front stopper 2f and a rear stopper 2g are disposed near both ends of the slide holding part 2d in the direction of the axis X. The front stopper 2f and the rear stopper 2g protrude from the inner wall of the hollow inner part 2a into the slide holding part 2d and have a function of restricting the forward/backward movement of the slide tip 6. That is, the slide tip 6 is slidable forward and backward between the front and rear stoppers 2f and 2g.

According to at least one embodiment, the buffer part 2e is a part in which the inner surface of the hollow inner part 2a is formed in a substantially cylindrical shape and has a function of absorbing a change in volume of the fluid chamber 12 (described later) in accordance with the movement of the water 8. The partition wall 4 is disposed inside the buffer part 2e. The partition wall 4 is used to divide the hollow inner part 2a into the fluid chamber 12 filled with the water 8 and an air chamber 14 opened to the atmosphere. Thus, the rear side of the partition wall 4 (a side near the tube 10), that is, a portion of the buffer part 2e and the slide holding part 2d correspond to the fluid chamber 12 and the front side of the partition wall 4 (a side opposite to the tube 10) and the other portion of the buffer part 2e correspond to the air chamber 14.

According to at least one embodiment, the partition wall 4 prevents the water 8 from leaking from the fluid chamber 12 toward the air chamber 14. The partition wall 4 is formed of, for example, a thin film material such as silicone rubber, urethane rubber, and a resin film, and it is desirable that the material can be largely deformed without resistance. Here, the deformation of the partition wall 4 includes an elastic deformation and a non-elastic deformation. The non-elastic deformation is, for example, a deformation caused by a change in shape when the partition wall 4 is formed of a non-elastic material such as a metal film or a resin film and means a deformation which is not elastic. When the tube 10 is elastically deformed by a pressurization or the like, the water 8 urges the slide tip 6 in a direction from the rear side toward the front side so that the slide tip 6 moves forward inside the slide holding part 2d. In accordance with this movement, the volume of the fluid chamber 12 increases. When the partition wall 4 is configured so that a change in volume of the fluid chamber 12 is absorbed by the partition wall 4 being deformed forwardly (rightwardly) as shown in (b) of FIG. 1.

In accordance with an increase in volume of the fluid chamber 12, the volume of the air chamber 14 decreases. An opening part 2h for absorbing the change in pressure inside the air chamber 14 at this time is formed in the air chamber 14. The inside of the air chamber 14 communicates with the outside of the casing 2 by the opening part 2h and the inside of the air chamber 14 is opened to the atmosphere.

According to at least one embodiment, a magnet (a first magnet) 16 is disposed at a front position of the casing 2 in the X direction when viewed from the slide tip 6. The magnet 16 has a function of urging the slide tip 6 to an initial position (a position in contact with the rear stopper 2g) by generating a repulsive force together with a magnet (a second magnet) 18 described later.

According to at least one embodiment, the slide tip 6 is a member that is disposed inside the fluid chamber 12 while being slidably held inside the slide holding part 2d. The slide tip 6 is formed as a substantially columnar member and is formed of a material such as resin, metal, and glass. FIG. 2 is a partial cross-sectional view showing the slide tip 6 when viewed from a lateral side. The magnet 18 is disposed at a position near a front surface of the slide tip 6, that is, a position near a surface close to the partition wall 4 when the slide tip is disposed inside the slide holding part 2d.

According to at least one embodiment, the magnet 18 faces the magnet 16 with the partition wall 4 interposed therebetween. The magnet 18 and the magnet 16 having the same polarity generate a repulsive force when faced to each other. By the repulsive force, the slide tip 6 is urged to contact the rear stopper 2g. When the tube 10 is elastically deformed due to a pressurization or the like so that the water 8 urges the slide tip 6 in a direction from the rear side toward the front side, the slide tip 6 moves forward against the repulsive force generated by the magnet 16 and the magnet 18 and the slide tip 6 contacts the front stopper 2f. That is, it is desirable that the repulsive force generated by the magnet 16 and the magnet 18 be strong enough to the extent that the slide tip 6 can contact the rear stopper 2g while the tube 10 is not pressurized and be weak enough to the extent that the slide tip 6 can move until contacting the front stopper 2f while the tube 10 is pressurized.

According to at least one embodiment, the circumferential surface of the slide tip 6 is provided with a groove (a circulation part) 20 formed from the rear surface of the slide tip 6 to the front surface thereof. The groove 20 allows the water 8 to flow to the side of the tube 10 and to the side of the partition wall 4. When the tube 10 is elastically deformed by a pressurization or the like so that the water 8 urges the slide tip 6 in a direction from the rear side toward the front side, a part of the water 8 passes through the groove 20 from the side of the tube 10 toward the side of the partition wall 4. Further, when the elastic deformation of the tube 10 is released so that the slide tip 6 moves backward, the water passes through the groove 20 from the side of the partition wall 4 toward the side of the tube 10.

According to at least one embodiment, the tip sensor 7 is a detecting means which is disposed at a position near the slide holding part 2d and outside the casing 2 and detects the movement of the slide tip 6. A concept of detecting the movement includes a detection of the presence/absence of the slide tip 6, a detection of the movement direction thereof, a detection of the movement speed thereof, and a detection of the position thereof. As the tip sensor 7, for example, a known detecting means such as an optical sensor, a winding coil, or a magnetic sensor can be used. When the optical sensor is used as the tip sensor 7, the presence/absence or position of the slide tip 6 can be detected by the detection of the forward/backward movement of the slide tip 6 in a light emitting and receiving area. When the winding coil is used as the tip sensor 7, the movement direction, movement speed or the like of the slide tip 6 can be detected by an electromagnetic induction generated by the approach/separation of the magnet 18.

Next, the operation of the fluid sensor S will be described. In a normal state, the slide tip 6 is disposed at an initial position in which the slide tip is urged to the rear stopper 2g due to the repulsive force generated by the magnet 16 and the magnet 18 (see (a) of FIG. 1). In this state, the tip sensor 7 detects the "absence" of the slide tip 6. Further, the partition wall 4 is deformed (moved) backward (leftward in (a) of FIG. 1).

When the tube 10 is elastically deformed by pressurization or the like, the water 8 inside the tube 10 moves forward to press the slide tip 6 in a direction from the rear side toward the front side. The slide tip 6 slides forward against the repulsive force generated by the magnets 16 and 18 and stops when contacting the front stopper 2f (see (b) of FIG. 1). At this time, the tip sensor 7 detects the "presence" of the slide tip 6. In accordance with the forward movement of the slide tip 6, the water 8 inside the fluid chamber 12 is pressed forward so that the volume of the fluid chamber 12 increases and the partition wall 4 is urged forward. The partition wall is deformed (moved) forward to absorb an increase in volume of the fluid chamber 12 and a change in pressure inside the fluid chamber 12. The partition wall 4 is deformed (moved) forward so that the volume of the air chamber 14 decreases, however since the air chamber 14 is opened to the atmosphere by the opening part 2h, the deformation (movement) of the partition wall 4 is substantially not disturbed.

When the elastic deformation of the tube 10 is released in accordance with the release of the pressurization or the like of the tube 10, a negative pressure acts inside the tube 10 so that the slide tip 6 moves backward. In addition to the repulsive force generated by the magnets 16 and 18, the slide tip 6 finally contacts the rear stopper 2g. Thus, the water 8 in the vicinity of the partition wall 4 also moves backward and the partition wall 4 is also deformed (moved) backward (see (a) of FIG. 1). At this time, the tip sensor 7 detects the "absence" of the slide tip 6.

In this way, according to the fluid sensor S, the elastic deformation of the tube 10, that is, the pressurization can be detected when the "presence" and the "absence" of the slide tip 6 are detected by the output of the tip sensor 7. Additionally, in the fluid sensor S of the embodiment 1, since the slide tip 6 is provided with the groove 20, the water 8 passes through the groove 20 from the side of the tube 10 toward the side of the partition wall 4 so that the partition wall is deformed (moved) with the passage of time even when the tube 10 is maintained in an elastically deformed state. Thus, a pressure difference between both front and rear sides of the slide tip 6 gradually decreases. As a result, the slide tip 6 returns to the initial position as in (a) of FIG. 1 due to the repulsive force generated by the magnets 16 and 18.

Since the slide tip 6 returns to the initial position with the passage of time even when the tube 10 is elastically deformed, the fluid sensor S can detect the forward movement of the slide tip 6 by the further elastic deformation (that is, multiple pressurization) of the tube 10.

Additionally, the hollow inner part 2a is not limited to a substantially cylindrical shape, and may be a polygonal tubular shape having a triangular or quadrangular cross-sectional shape. When the slide holding part 2d has a polygonal tubular shape, the slide tip 6 may be also formed in a polygonal columnar shape so as to correspond thereto. The circulation part 20 is not limited to the groove formed on the circumferential surface of the slide tip 6 and may be a penetration hole penetrating the slide tip 6 or a notch formed therein so as to substantially realize the circulation of the fluid between the side of the tube 10 and the side of the partition wall 4. Further, the circulation part does not need to be essentially formed at the side of the slide tip 6 and may be formed at the side of the slide holding part 2d.

According to the fluid sensor S, the pressure of the water 8 does not substantially increase during the operation of the sensor, that is, during the elastic deformation of the tube 10. Thus, the detection operation of the sensor is not substantially influenced even when a gas such as a bubble is mixed with the water 8. That is, it is possible to realize a high detection accuracy of the fluid sensor S even when some bubbles or the like are mixed in the production process of the fluid sensor S or the connection process of the fluid sensor S with the tube 10. Further, it is possible to easily adjust the detection sensitivity of the fluid sensor S by displacing the arrangement position of the tip sensor 7 in the front-back direction.

Embodiment 2

Figure 3A:
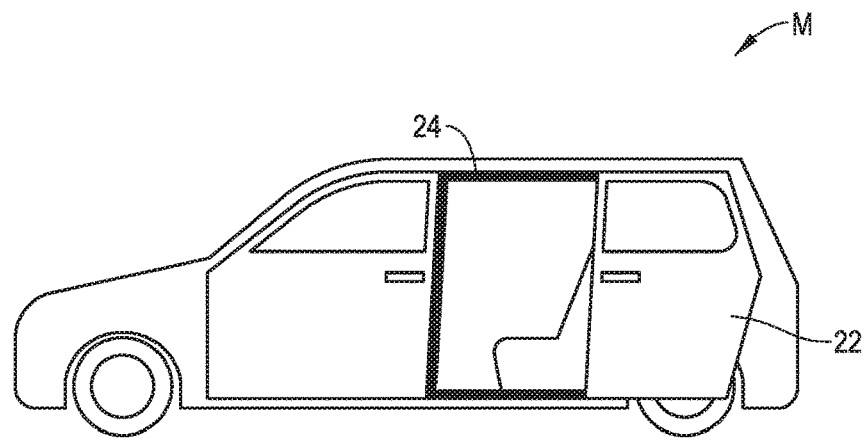
FIG. 3 shows (a) and (b) of a diagram according to an embodiment showing an application example of a fluid sensor.
Figure 3B:
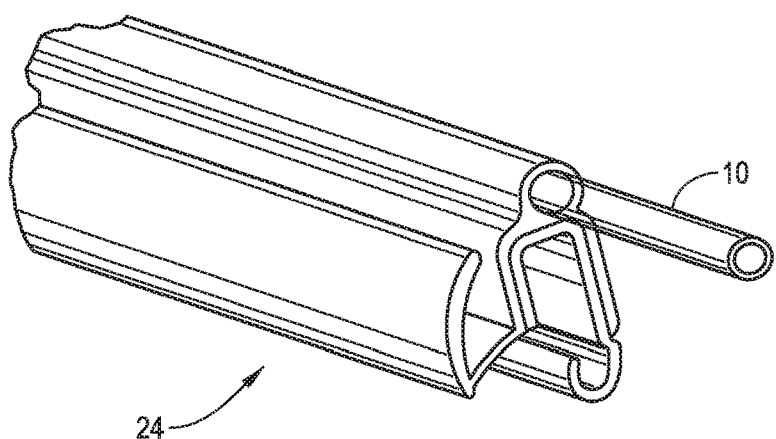

FIG. 3 shows (a) and (b) of a diagram showing an application example of the fluid sensor S. FIG. 3 shows (a) a side view of an automobile M with a slide door 22. A door seal 24 is disposed in the periphery of the body when the slide door 22 of the automobile M is opened. As shown in (b) of FIG. 3, the tube 10 which is an elastic container is disposed to extend along the door seal 24. The fluid sensor S of the embodiment 1 is connected to the tube 10.

In the door seal 24, if the slide door 22 is closed in a normal state where a foreign material such as a hand is not in contact with the tube 10, the tube 10 is not pressurized. However, if a foreign material such as a hand is in contact with the tube 10 when the slide door 22 is closed, the tube 10 is pressurized by the foreign material to be elastically deformed and the fluid sensor S detects the pressurization. Accordingly, it is possible to reliably detect the contact of a foreign material with respect to the tube 10 when the slide door 22 is closed.

Embodiment 3

According to at least one embodiment, a tube 10 connected to the fluid sensor S can be used while being laid on a ground of a parking lot. The tube 10 is laid so as to pass through a part corresponding to a ground contact position of a tire when an automobile enters a parking lot. At this time, the tube 10 is laid to pass through a plurality of parking spaces.

When the fluid sensor S detects a state where the tube 10 is pressurized by the tire of the automobile to be elastically deformed, it is possible to detect the entry or exit of the automobile into or from the parking space. Further, according to the fluid sensor S, when a predetermined time elapses after the detection of the entry of one automobile, the entry of other automobiles can be detected. Thus, it is possible to detect the entry of a plurality of automobiles by one fluid detection sensor S without using a plurality of detecting means.

While the preferred embodiments of the invention have been described above, the invention is not limited thereto, and various modifications and changes can be made within the scope of the gist thereof.

According to various embodiments, since the movement of the fluid is detected by the detection of the sliding movement of the slide tip in the normal/reverse direction without using the pressure sensor, it is possible to realize a stable fluid detection regardless of a temperature change or an attachment state. Since a change in pressure of the fluid is reduced by the deformation of the partition wall, the stable operation of the slide tip is realized. Thus, even when bubbles or the like are mixed with the fluid, a high detection accuracy can be maintained. Since the air chamber is opened to the atmosphere, the deformation of the partition wall is not disturbed. When the magnets repelling each other are used as an urging member that urges the slide tip to the initial position, a stable urging force can be applied to the slide tip across the partition wall in a non-contact manner.

When the stopper is provided at the positions near both ends of the slide holding part, the movement range of the slide tip can be restricted in the normal/reverse direction (the front-back direction). A reliable movement operation of the slide tip is realized in the repeated presence/absence detection of the slide tip.

When the repulsive force generated by the two magnets is set as the repulsive force for bringing the slide tip into contact with the rear stopper, the slide tip can be reliably set to the initial position by a non-contact urging force. It is possible to eliminate adverse influences due to the layout of the fluid sensor, vibration, or the like.

When the slide tip and/or the slide holding part is provided with the circulation part, the fluid can be circulated between the side of the tube and the side of the partition wall. Even after the slide tip has moved due to the elastic deformation of the tube, the slide tip can be automatically returned to the initial position after a predetermined elapse of time. Since the elastic deformation of the tube can be detected a plurality of times (at a plurality of positions) by one fluid sensor, the number of the sensors can be decreased.

When the diameter of the air chamber is set to be larger than the diameter of the slide holding part, it is possible to improve an ability in which the buffer part absorbs a change in volume of the fluid chamber. That is, even when the tube is elastically deformed so that the volume of the fluid chamber increases, the deformation of the partition wall can be suppressed to be small.

Additionally, in the above-described embodiments, the first magnet 16 and the second magnet 18 having the same polarity are arranged to face each other, and a mutual repulsion is used as an urging force (used as an initial position restoring means) so that the slide tip 6 is restored to the initial position (a position where the slide tip abuts the rear stopper 2g). However, as the initial position restoring means, the use of an urging force of a spring or the like, the use of an elastic force of an elastic material, the use of the gravity to the slide tip 6, the use of the buoyancy of the fluid 8, and the like can be taken into consideration in addition to the use of the magnet.

For example, when the density of the entire slide tip 6 is set to be sufficiently lower than the density of the fluid 8, the slide tip 6 can be restored to the initial position by the buoyancy of the fluid 8. In this case, it is necessary to dispose the fluid sensor S so that the rear stopper 2g is located above the slide holding part 2d. Further, when the density of the entire slide tip 6 is set to be sufficiently higher than the density of the fluid 8, the slide tip 6 can be restored to the initial position by the gravity of the slide tip 6. In this case, it is necessary to dispose the fluid sensor S so that the rear stopper 2g is located below the slide holding part 2d.

When the density of the entire slide tip 6 including the magnet 18 is adjusted to be substantially the same as the density of the fluid 8, it is possible to eliminate an influence of the gravity or buoyancy of the slide tip 6 due to the attachment direction. Here, the density of the entire slide tip 6 including the magnet 18 means the density of the entire slide tip 6 sliding inside the slide holding part 2d. For example, when a hollow part is formed inside the slide tip 6, the density of the entire slide tip 6 can be adjusted to be decreased. Of course, when the magnet is not used as the initial position restoring means, the magnet does not need to be considered in the density of the slide tip 6.

As a result, the stability of the function of holding the slide tip at a fixed position is improved, and a sensitive handling is not necessary and an operation becomes extremely easy even when the fluid sensor is mounted (assembled) to an application object. In addition, it is possible to effectively apply a force of urging the slide tip 6 to the initial position by the initial position restoring means to the slide tip 6.

The time required for restoring the slide tip to the initial position can be appropriately set by the selection of the fluid (viscosity), the design of the circulation part, the adjustment of the repulsive force of the magnet, or the like. Further, the density of the entire slide tip 6 is desirably in the range of 0.5 times to 2.8 times the density of the fluid 8 when eliminating the influence of gravity and buoyancy, more desirably in the range of 0.7 times to 1.4 times the density of the fluid, and further desirably substantially equal to the density of the fluid.

REFERENCE NUMERALS d1, d2 diameter
M automobile
S fluid sensor (fluid detection device)
X axis
2 casing
2a hollow inner part
2b small diameter part 2c large diameter part
2d slide holding part
2e buffer part
2f front stopper
2g rear stopper
2h opening part
4 partition wall
6 slide tip
7 tip sensor (detecting means)
8 water (fluid)
10 tube (elastic container)
12 fluid chamber
14 air chamber
16 magnet (first magnet)
18 magnet (second magnet)
20 groove (circulation part)
22 slide door
24 door seal

What is claimed is:

1. A fluid detection device, comprising:
a casing connectable to one end of an elastic container filled with a fluid and comprising a hollow inner part so that the fluid inside the elastic container flows to the hollow inner part;
a partition wall disposed in the hollow inner part and is deformable so that the hollow inner part is divided into a fluid chamber filled with the fluid and an air chamber opened to the atmosphere;
a slide tip disposed inside the fluid chamber; and
a detecting means disposed outside the casing,
wherein a slide holding part which holds the slide tip to be slidable forward and backward in one direction is formed inside the fluid chamber, and
wherein the air chamber is provided with an opening part which absorbs a change in pressure inside the air chamber due to a deformation of the partition wall, the fluid detection device further comprising a first magnet disposed in the casing to be located at a position along the movement direction of the slide tip,
wherein the slide tip comprises a second magnet which is provided at a position facing the first magnet and repelling the first magnet,
wherein the detecting means detects the movement of the slide tip, and
wherein the movement of the slide tip is detected based on an elastic deformation of the elastic container.

2. The fluid detection device according to claim 1, wherein stoppers which restrict the movement of the slide tip are located at positions near both ends of the slide holding part in the movement direction of the slide tip.

3. The fluid detection device according to claim 2, wherein a repulsive force generated by the first magnet and the second magnet is a repulsive force capable of bringing the slide tip into contact with the stopper located at the end of the slide folding part at the side farther from the partition wall.

4. The fluid detection device according to claim 1, wherein at least one of the slide tip and the slide holding part is provided with a circulation part for circulating the fluid between the side of the elastic container and the side of the partition wall.

5. The fluid detection device according to claim 1, wherein the slide tip has a substantially columnar shape, the casing has a substantially cylindrical shape, and a diameter of the air chamber is larger than a diameter of the slide holding part.

6. The fluid detection device according to claim 1, wherein a density of the entire slide tip including the second magnet is in the range of 0.5 times to 2.8 times a density of the fluid.

* * * * *